Patented Oct. 10, 1950

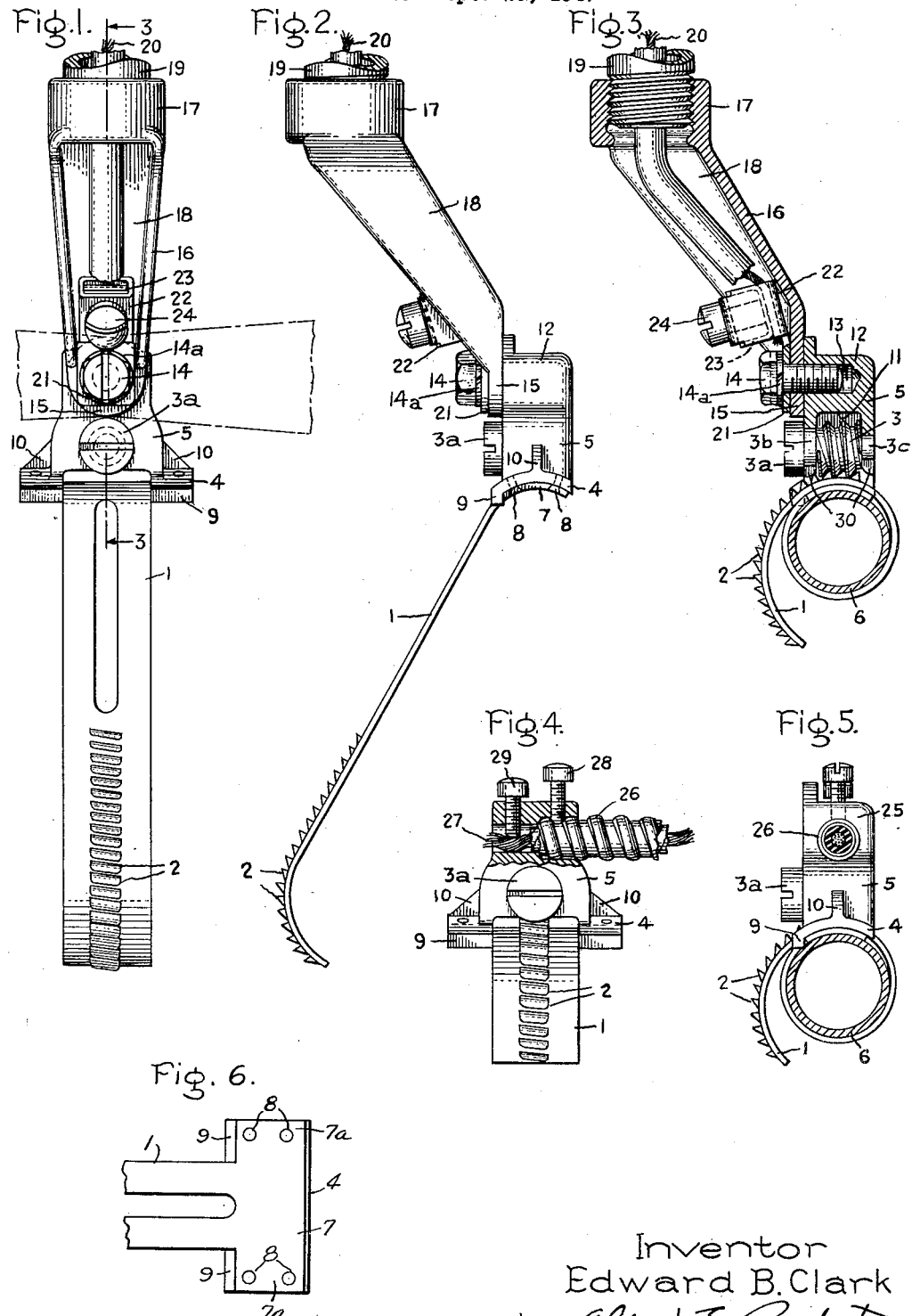

2,525,447

UNITED STATES PATENT OFFICE 2,525,447

GROUNDING DEVICE

Edward B. Clark, Milford, Conn., assignor to General Electric Company, a corporation of New York Application September 25, 1947, Serial No. 776,060

1 Claim. (Cl. 173—273)

The present invention relates to electric grounding devices especially adapted for connecting a ground wire to a grounding electrode such as water pipe and especially to copper water tubing.

It is an object of the present invention to provide a grounding device which is especially adapted for making a ground connection to copper water tubing, water pipe or other grounding electrodes for a bare ground wire or a ground wire or ground cable contained in rigid electrical conduit or flexible armor. A further object of my invention is to provide a grounding device for the foregoing purposes which is adjustable to fit varying directions of approach of the axes of the rigid conduit and the water tubing. A still further object is to provide a device shaped to give adequate separation between the end of a rigid conduit and the water pipe for ease in installation, while at the same time providing protection for the ground wire as it emerges from the conduit. A still further object of my invention is to provide a grounding device which will make good electrical connection to thin walled copper tubing without danger of damaging the tubing.

My invention will best be understood from the following description taken in connection with the accompanying drawing in which Fig. 1 is a plan view of my grounding device; Fig. 2 is an elevation; Fig. 3 is a section taken along the line 3—3 in Fig. 1 and showing the flexible strap portion wrapped around a grounding electrode such as copper water tubing; Fig. 4 is a plan view of a modification particularly adapted for use with bare ground wire or armored cable or ground wire; Fig. 5 is an elevation of the device of Fig. 4 showing the flexible strap wrapped around a grounding electrode such as a copper water tube; and Fig. 6 is a partial bottom view of the main body portion of the embodiment of my grounding device shown in Fig. 2.

The embodiment of my grounding device shown in Figs. 1 to 3 comprises two major parts pivotally connected together; one part, which may be termed a ground connector, is adapted for connection to copper water tubing or other ground electrodes, and the other part, which may be termed a conduit connector, is adapted to receive the end of a rigid conduit containing a ground wire. The ground connector part of my device comprises a strap 1 which is preferably made of a pliable conductive material such as commercial bronze so that it can readily be wrapped around a fundamentally cylindrical shaped grounding electrode. The free end of the strap has a plurality of teeth 2 formed in it by making parallel lancings transversely of the center line of the strap 1, the material of the strap being pressed outward from one surface adjacent each of the parallel cuts. The teeth which are thus formed without loss of any material have substantially straight flat sides facing away from the free end of the strap and inclined slightly to the center line of the strap with smoothly rounded surfaces facing the free end of the strap. The teeth are adapted to be engaged by a worm or screw 3 as will be described in more detail below.

The upper end of the strap 1, as illustrated in Figs. 1 and 2, is secured to a saddle 4 which is preferably made integral with a housing 5 for the worm 3. The saddle 4 is preferably wider than the strap 1 and has its undersurface shaped to follow the contour of copper water tubing 6 so as not to dent the tubing appreciably and to limit the tendency of relatively soft copper tubing to collapse. The upper end 7 of the strap 1 has laterally projecting arms of the same width as the saddle 4 and its surface is formed closely to fit the contour of the under surface of the saddle to which it is secured by rivets 8 or by brazing or both. In order to provide additional strength to the joint and a locating means in assembly between the strap and the saddle, the arms of the saddles are provided with downwardly extending lips 9 forming abutments for the edges of the arms 7a of the upper end 7 of the strap. This structure is shown in detail in Fig. 6, which is a partial bottom view of the clamp as shown in Fig. 2. The lips 9 thus relieve the rivets 8 or the brazing from some of the stress when the strap is tightened around the grounding electrode or water tube or pipe 6. Strengthening webs 10 between the arms of the saddle 4 and the housing 5 may also be provided.

The housing 5 is recessed at 11 to provide space for the helical worm or screw 3 having a slotted head 3a, a neck portion 3b forming one bearing for the worm, and a tail portion 3c forming another bearing. The two bearing portions 3b and 3c are journaled in round ended slots formed in the wall of the housing 5 and communicating with the recess 11. The lower inner edges of the walls of the recess are rounded as shown at 30, Fig. 3, so as not to catch the ends of the worm 3. The threads of the worm 3 are by its bearings positioned sufficiently above the end portion 7 of the strap so that the free end of the strap after being wrapped around a grounding electrode such as water pipe or tubing 6 can be passed between the arms of the saddle over the fixed end 7 of the strap so that the teeth 2 will be engaged by the threads of the worm 3. When the worm is turned, as by means of a screwdriver engaging the slot in the head 3a, the strap 1 will be wrapped tightly around the electrode or water tube 6 to make good electrical contact with the same. Above the recess 11, the housing member 5 has a solid boss portion 12 which is drilled and threaded at 13 to receive a bolt 14 for securing the conduit connector which forms the second part of my grounding device.

The conduit connecting member 18 consists of a single piece of conducting material, preferably cast brass, comprising a foot portion 15, a tapered, channeled throat portion 16 and a conduit receiving hub 17. The hollow cylindrical hub portion 17 is internally threaded to receive the threaded end of a rigid conduit 19 containing a ground wire or cable 20. The channeled throat portion 16 extends at an angle of approximately 45° to the axis of the cylindrical hub portion 17 and is tapered to reduce its width from the full diameter of the hub 17 to a width which is just sufficient to make adequate mechanical and electrical connection with the boss 12 of the housing 5. The throat portion 16 is provided with side walls also tapered in height from substantially the full diameter of the hub 17 to substantially zero at the foot 15, thus forming a channel for receiving and protecting the ground wire 20. A hole is drilled in the foot 15 to receive the bolt 14 whereby the conduit connecting member 16 is pivotally secured to the boss 12. By means of the pivoted connection, my grounding device is adapted for use irrespective of the directions of approach of the axes of the water pipe 6 and the conduit 19. By tightening the bolt 14, however, the connection is made quite rigid, especially with the use of a lockwasher 14a.

Between the head of the bolt 14 and the foot 15 of the connecting member 16 there is inserted the tang 21 of a ground wire receiving terminal 22 of the pressure type. This may consist of a hollow pressed metal member adapted to receive the end of the wire 20 and having within the opening a U-shaped pressure member 23 adapted to be pressed against the wire 20 by means of a screw 24 threaded into a wall of the member 22.

It will be observed that by reason of the 45° angular extension of the throat portion 16 the end of the conduit 19 is at all times visible which makes it easy to pull the wire 20 through the conduit after the connecting member 18 has been secured to the conduit. Similarly, adequate space is provided for connecting the end of the ground wire 20 to the terminal member 22 while at the same time, by reason of the channeled design of the member 18, the ground wire is mechanically protected after its installation.

A modification of my grounding device, particularly for use with flexible armored ground wire is shown in Figs. 4 and 5. In this modification only a single part is required. In so far as the two modifications are similar, the same reference numerals have been used in the illustrations. In fact the two modifications are quite similar in so far as the ground connecting element including the strap 1 and worm carrying housing 5 are concerned. The latter, however, is provided with a boss 25 having a hole therein extending preferably at right angles to the strap tightening worm for securing the end of a flexible armored cable or ground wire 26 and the ground wire 27. As best shown in Fig. 4, one half of the hole is large enough to accommodate the armor 26 which is held in position and grounded by the screw 28. The remainder of the hole is of smaller diameter sufficient to receive a grounding wire 27 to which electrical connection is made by means of the screw 29.

What I claim as new and desire to secure by Letters Patent of the United States is:

In a ground device, a pliable metal strap adapted to surround a grounding electrode, said strap having a series of teeth adjacent one end thereof and laterally projecting arms at the opposite end thereof, a solid metal housing having a recess in one end with aligned bearing openings in opposite walls of said recess, said housing having an integral saddle portion of the same width as said arms of said strap and having a concave surface shaped substantially to correspond to the contour of a grounding electrode, said saddle having spaced lip portions extending from an edge thereof and adapted to form abutments for the edges of the arms of said strap, means securing the arms of said strap to said saddle and a threaded worm positioned within the recess of said housing and journalled in said bearing openings for engaging the teeth of said strap for tightening the same around a grounding electrode.

EDWARD B. CLARK.

REFERENCES CITED

The following references are of record in the file of this patent:

UNITED STATES PATENTS

| Number | Name | Date |
| --- | --- | --- |
| 1,584,935 | Hathorn | May 18, 1926 |
| 1,670,009 | Sawyer | May 15, 1929 |
| 2,038,436 | Mangin | Apr. 21, 1936 |
| 2,137,840 | Hayes | Nov. 22, 1938 |

FOREIGN PATENTS

| Number | Country | Date |
| --- | --- | --- |
| 526,139 | Great Britain | Sept. 11, 1940 |